United States Patent Office 3,315,743
Patented Apr. 25, 1967

3,315,743
AQUEOUS SOLUTION FLOW IN PERMEABLE
EARTH FORMATIONS
Milton K. Abdo and Peggy M. Dunlap, Dallas, Tex., assignors to Mobil Oil Corporation, a corporation of New York
No Drawing. Filed Dec. 8, 1964, Ser. No. 416,901
15 Claims. (Cl. 166—9)

This invention relates to flow of an aqueous solution in a permeable earth formation. Particularly, this invention pertains to a method of treating a subterranean formation by flowing into the formation an aqueous solution. More particularly, this invention is directed to improving the recovery of petroleum, or oil, from an oil-containing subterranean formation by flowing therethrough an aqueous solution.

The oil accumulated in subterranean formations is recovered or produced therefrom through wells drilled into the subterranean formations. A large amount of the oil is left in a subterranean formation if produced only by primary depletion, i.e., by employing only initial formation energy to recover the oil. Supplemental operations, often referred to as secondary recovery operations, are used to improve the extent of recovery. In certain of these supplemental recovery operations, a fluid is injected into a well, called an injection well, and passed into the formation. Oil is displaced within and is moved through the formation, and is produced from one or more other wells, called production wells, as the injected fluid passes from the injection well toward the production wells. In a particular recovery operation of this sort, water is employed as the injected fluid and the operation is often referred to as a water flood. The injected water is referred to as the flooding water, as distinguished from the in-situ or connate water of the formation.

Two major types of sweep efficiency, i.e., macroscopic, or areal, sweep efficiency and microscopic sweep efficiency, measure the effectiveness of the passage of the injected fluid through the formation.

The first type, the macroscopic sweep efficiency, is most seriously affected by permeability stratification of the subterranean formation and by the difference between the viscosity of the in-situ oil and the injected fluid. In any operation in which a fluid is injected through an injection well into a subterranean formation, permeability stratification is significant, and it is most significant in secondary recovery operations. By causing a disproportionately large amount of the injected fluid to enter the more permeable zones, this stratification results in premature production of the injected fluid at the production wells. The premature production is referred to as premature breakthrough and manifests itself as an increasing ratio of the injected fluid to the oil in the produced fluids. Thus, premature breakthrough can render an otherwise well-engineered recovery project relatively uneconomical because of the cost of treating and recycling of injected fluid.

Where the viscosity of the injected fluid is markedly less than the viscosity of the in-situ oil, a situation referred to as instability is created. In this situation, the less viscous injected fluid tends to develop fingers or bulges which may be caused by points of minute inhomogeneity in the formation. These fingers grow and trave at a much faster rate than the remainder of the injected fluid, and thus also cause premature breakthrough.

Various means have been proposed to improve macroscopic sweep efficiency and thereby avoid premature breakthrough. Selective plugging operations have been proposed to correct permeability stratification. Viscosity gradation, wherein a liquid or liquids having a viscosity between that of the injected fluid and that of the in-situ oil is injected into the formation prior to the injected fluid, has been proposed to cure or minimize instability fingering. One method which has been proposed to correct both the permeability stratification and the instability fingering involves the use of a thickener in the flooding liquid. More specifically, it has been proposed to add thickeners to at least a portion of the flooding water.

The second type of sweep efficiency, the microscopic sweep efficiency, is influenced by the interfacial tension between the injected fluid and the in-situ oil; by the contact angle, i.e., the angle at which the interface between the oil and the injected fluid contacts the solid surface; and by the permeability of the formation. To achieve improved microscopic sweep efficiency of flooding water, it has been proposed to add a surfactant to the water to decrease the interfacial tension and to alter the contact angle. Available methods of altering permeability, such as fracturing or acidizing, are of limited benefit in improving microscopic sweep efficiency since they do not affect to any great extent the over-all permeability of the formation but rather create only localized flow channels of high permeability.

Despite experimental and field use of the foregoing additives and methods, much oil continues to remain in a subterranean formation after the best supplementary recovery mechanisms heretofore known have been employed.

Therefore, it is an object of this invention to provide a method of achieving more nearly uniform injection and flow profiles when treating a subterranean formation by flowing an aqueous solution therein.

It is also an object of this invention to provide a method for evening out injection and flow profiles of an aqueous solution flowed in a subterranean formation, benefiting the distribution pattern of any other fluids injected concurrently, alternately, or subsequently.

It is another object of the invention to provide a method of recovering oil by passing through a formation flooding water which has been treated to achieve increased macroscopic sweep and microscopic displacement efficiencies.

It is another object of the invention to provide a method of decreasing the flow of flooding water in more permeable zones relative to flow in less permeable zones within a subterranean formation.

Further objects and attendant advantages of the invention will be apparent from the description hereinafter.

In accordance with the invention, in the treatment of a permeable subterranean formation, there is passed into the formation, through an injection well, an active solution comprising water having incorporated therein a copper cetyl tolyl ether sulfonate in a quantity sufficient to provide a solution which is viscoelastic and which is also a shear hardening, positive nonsimple liquid. In a specific aspect of the invention, in the recovery of oil from a subterranean formation by injecting a flooding liquid through an injection well and into the formation and producing oil from the formation through a production well, the active solution is employed as the flooding liquid. The reasons why the solutions containing the copper cetyl tolyl ether sulfonate are termed "active solutions" will later become apparent.

A viscoelastic liquid is a liquid which possesses both elastic and viscous properties. Viscoelastic liquids have a characteristic viscosity function, which function may or may not be dependent on rate of shear or stress. They also exhibit elasticity of shape and a retraded elastic recovery in deformation. A viscoelastic liquid may be a solution comprising one or more solvents containing one or more solutes.

In laminar flow of a viscoelastic liquid, components of stress which are normal as well as tangential to the direction of the stress frequently develop and secondary flow effects appear. Thus, the normal stresses in a viscoelastic liquid flowing in a circular conduit cause an appreciable axial tension to develop. When the flowing liquid emerges from a circular conduit, the tension in the streamlines relaxes with the result that the liquid stream swells to a diameter in excess of the diameter of the opening of the conduit. Accordingly, the liquid leaving the conduit expands or bulges outwardly, forming what might be termed an enlarged bulb at the opening of the conduit.

Another characteristic of a viscoelastic liquid is its flow behavior between concentric cylinders having relative rotation with respect to each other. Analysis of the complete spatial distribution of stress for a viscoelastic liquid in this situation shows that the primary phenomenon is the appearance of an additional tension along the streamlines. Between the concentric cylinders, at least one of which is rotating, the streamlines are circles and the tension becomes a hoop or strangulation stress which contricts the liquid toward the axis of rotation. As a consequence, the liquid tends to climb the inner cylinder and a pronounced thrust develops.

Further with respect to the characteristics of a viscoelastic liquid, it can be shown by theoretical analysis that flow in rectilinear paths through conduits of arbitrary cross section under a constant pressure gradient is not always possible for certain of these liquids. Thus, if the flow conduit is noncylindrical, superimposed onto the simple rectilinear motion is a steady motion in which liquid particles follow spiral paths to develop a vortexlike motion.

Each of the properties of a viscoelastic liquid described above is of value in displacing oil from a subterranean formation. Flow of the liquid through the interstices of a subterranean formation will ordinarily be laminar. Thus, with the development of axial tension of the viscoelastic liquid upon flow from restraining portions of substantially circular interstices, or conduits, within the formation, the resulting bulging effect enables the viscoelastic liquid to displace the oil from adjacent wider portions of the interstices. The development of tension along the streamlines of flow of the viscoelastic liquid and the development of thrust by the liquid will additionally effect displacement of the oil otherwise trapped within the interstices of the formation. Furthermore, the development of vortexlike motion in the flow of the viscoelastic liquid in noncircular interstices effects a thorough displacing action by the viscoelastic liquid of the oil in the interstices.

As the name implies, a shear hardening liquid is a liquid which hardens, i.e., develops a higher viscosity, when subjected to certain rates of shear. The property of shear hardening thus enables such a liquid to develop a higher viscosity when subjected to a higher rate of shear in a subterranean formation. Such a higher rate of shear is induced in a liquid when it flows in a more permeable stratum than when it flows in parallel, i.e., under the influence of the same pressure drop, in a less permeable stratum within a subterranean formation. A shear hardening liquid thus is active in that it becomes selectively more viscous in the more permeable strata than in the less permeable strata. As a result, the rates of flow of the liquid in the more permeable and in the less permeable strata become more nearly equalized and premature breakthrough is lessened.

A positive nonsimple liquid is a liquid which has a higher viscosity when it flows in a more permeable stratum than when it flows at the same nominal rate of shear in a less permeable stratum. A positive nonsimple liquid thus is active in the sense that it adjusts its properties to flow at a rate which is relatively insensitive to the permeability of the various strata within a subterranean formation through which it is flowing. This phenomenon differs from that of shear hardening in that the positive nonsimple liquid increases in viscosity in the more permeable strata through which it is flowing even at equal rates of shear. Permeability controls whether a flowing positive nonsimple liquid becomes more viscous or not, whereas shear rate controls whether a flowing shear hardening liquid becomes more viscous or not. Both phenomena operate to achieve more nearly uniform injection and flow profiles of a shear hardening, positive nonsimple liquid passing through a subterranean formation.

The active solutions employed in the method of the invention exhibit the properties of viscoelasticity, shear hardening, and positive nonsimplicity. Through the properties of shear hardening and positive nonsimplicity, they improve the macroscopic sweep efficiency and thus enable the recovery of a greater portion of the oil from a subterranean formation before they break through at a production well. Since the active solutions are also viscoelastic, they improve the microscopic displacement efficiency as they pass through the subterranean formation.

Whether a particular solution exhibits the property of viscoelasticity or not can be determined by one of many well-known tests. If a solution exhibits the previously described properties, e.g., (1) swelling to a diameter in excess of the diameter of the conduit upon emerging therefrom or (2) climbing an immersed cylinder having rotational motion with respect thereto, it is viscoelastic. Further tests for determining whether a liquid is viscoelastic or not may be found in a number of published books discussing the phenomenon, e.g., Viscoelastic Properties of Polymers, J. D. Ferry, Wiley Publishing Company, New York, 1961.

Whether a particular liquid exhibits the properties of shear hardening or positive nonsimplicity can be determined from its behavior in a rotational viscometer, such as a Couette-type viscometer. The viscosity of the liquid, measured as a function of the rate of shear on such a rotational viscometer at different gap sizes, indicates the existence of each of the properties. The gap size in such a viscometer is the distance separating the concentric cylinder walls immersed in the liquid whose viscosity is being measured. The curve which results from plotting the data obtained on the viscometer, e.g., plotting the viscosity as the ordinate against the shear rate as the abscissa, depicts the properties of shear hardening or positive nonsimplicity. With a solution, if the curve representing the viscosity of the solution increases with increasing shear rates within a certain range of shear rates, the solution is a shear hardening liquid. If the viscosity of the solution is higher when measured in a larger gap size at the same shear rate, the solution is a positive nonsimple liquid. Further, with solutions exhibiting the properties of shear hardening and positive nonsimplicity, the relative quantitative activity of the solution is measured by the area between the curve representing the viscosity response of the solvent and the curve representing the viscosity response of the solution at an arbitrarily chosen gap size. One useful gap size is 0.123 centimeter between concentric cylinders having radii of 1.257 and 1.380 on a U.L. adapter of a Brookfield Model LVT Synchro-Lectric viscometer having variable rate of rotation.

The properties of shear hardening and positive nonsimplicity also can be determined by flowing a liquid through models or core samples of subterranean formations having different permeabilities. The pressure drop at a known flaw rate may be measured and the viscosity calculated therefrom. By taking measurements over a range of flow rates, the solution flow properties may be characterized as a function of permeability and shear rate. Such determinations carried out in models or core samples are time consuming, and the use of a rotational viscometer is preferred to delineate liquids having the properties of shear hardening and positive nonsimplicity.

In the pracitce of the invention, the requisite concentration, as discussed hereinafter, of a copper cetyl tolyl ether sulfonate is incorporated into water to prepare the active solution. The term "water" is used herein to include dilute aqueous solutions such as surface water, well water, rain water, city water, treated waste water, and suitable oil field brines. Where brines are employed to prepare the active solution, they may contain up to about 2 percent by weight of sodium chloride. However, brines containing greater amounts of sodium chloride are desirably not employed since concentrations of strong electrolyte greater than about 2 percent by weight tend to destroy the activity of the active solution.

Of the copper cetyl tolyl ether sulfonates, the copper cetyl o-tolyl ether sulfonate is the preferred salt for preparing the active solutions. Copper cetyl p-tolyl ether sulfonate and copper cetyl m-tolyl ether sulfonate may also be employed. Of the latter two, the copper cetyl p-tolyl ether sulfonate is preferred. Further, mixtures of these copper cetyl tolyl ether sulfonates may be incorporated into water to form the active solutions. When a mixture of copper cetyl tolyl ether sulfonates is used, it is preferable to employ copper cetyl o-tolyl ether sulfonate and copper cetyl p-tolyl ether sulfonate.

A particular copper cetyl tolyl ether sulfonate is prepared as described by G. S. Hartley in his "Sulfonates of Higher Alkyl Phenolic Ethers," Journal of the Chemical Society, pp. 1828 to 1834, in 1939. The essential steps are:

(1) Preparing the cetyl ether of the tolyl compound by reacting cetyl bromide with the appropriate hydroxytoulene;

(2) Sulfonating the cetyl ether of the tolyl compound with a suitable sulfonating agent, such as concentrated sulfuric acid or chlorosulfonic acid, to form the cetyl tolyl ether sulfonic acid; and (3) Reacting the cetyl tolyl ether sulfonic acid with a cupric salt, such as copper sulfate, to form the copper cetyl tolyl ether sulfonate.

As noted hereinbefore, an amount of a copper cetyl tolyl ether sulfonate is employed which is sufficient to convert the water to which it is added into an active soluion, i.e., a viscoelastic solution which is also a shear hardening, positive nonsimple liquid. A minimum concentration of at least 0.0002 percent by weight copper cetyl tolyl ether sulfonate is required in the active solution. Preferably, a minimum concentration of at least 0.01 percent by weight is employed. If all of the flooding water being added to the formation is treated by incorporating a copper cetyl tolyl ether sulfonate therein, an optimum concentration is from about 0.01 to about 0.05 percent by weight. Where a smaller slug of water is to be treated, a higher concentration of from about 0.05 to about 0.5 percent by weight is employed to increase the effectiveness of the slug in recovering additional oil. Generally, no more than about 1.0 percent by weight is required. However, the maximum concentration which is desirable is dependent upon the temperature and permeability contrast in the subtraeean formation in which the flooding active solution is to be employed. Infrequently, therefore, it may be necessary to employ as high as 5.0 percent by weight or more of a copper cetyl tolyl ether sulfonate in the flooding water to obtain the desired activity.

These active solutions are effective when used in the method of the invention at temperatures of from about 80° to about 99° C. These active solutions remain active at a pH range from about 4.5 to about 11.

Where a formation is to be treated by injecting floodwater into the formation, the copper cetyl tolyl ether sulfonate may be incorporated in only a portion of the flooding water to create a slug or slugs of active solution. Each slug should have a volume of from 0.1 to 30 percent, preferably 1.0 to 10 percent, of the pore volume of the formation. The slug of active solution is injected through the injection well and passed into the formation. The slug may be driven into the formation by injecting behind it a driving fluid such as water or natural gas. Such a slug may be injected only once or may be injected alternately with a volume of driving fluid, preferably having at least the same volume as the slug and preferably being untreated water, between alternate slugs of active solution to achieve the desired recovery of oil from the subterranean formation. Instead of untreated water, water having lower concentrations, e.g., 0.001 to 0.05 percent by weight, and hence less activity as a viscoelastic, shear hardening, positive nonsimple liquid may be used between alternate slugs of active solution. Each slug of active solution tends to even out the flow, to alter the pressure gradients, and more nearly to compensate for permeability stratification in the formation. Hence, the greater the number of treated slugs, the more effective will be the flood. This is, of course, more expensive and the particular formation will dictate the economics of the amount and frequency of the slugs which are to be injected, ranging from only one slug to treating all of the flooding water.

It is possible to precipitate calcium cetyl tolyl ether sulfonate if the active solutions employed in the invention come in contact with formation liquids containing calcium, and it is preferred to take steps to prevent such precipitation.

One way to prevent such precipitation is to inject a slug of from 0.01 to .10 percent or more of the pore volume of water in advance of the active solution. The water will build up a bank and miscibly displace the aqueous formation liquids containing the calcium ions, thus preventing contact of the active solution with the aqueous formation liquids.

Another way to prevent such precipitation is to incorporate into the active solution a chelating or sequestering agent such as tetrasodium salt of ethylenediaminetetraacetic acid, sold commercialy as sodium Versenate, or sodium phosphate glass, commonly called sodium hexametaphosphate and sold commercially as Calgon. Other chelating or sequestering agents include the soluble phosphates such as sodium pyrophosphate. The amount of chelating agent should be at least 0.1 percent by weight. Where sodium chloride is present, or may become present, in the active solution, the total concentration of sodium chloride and chelating agent preferably will not exceed about 2.0 percent by weight. Generally, the amount of chelating agent employed is less than about 1.7 percent by weight. On the other hand, with amounts of sodium chloride less than 0.3 percent by weight, greater amounts of chelating agent may be employed. Alternatively, a slug of from 0.01 to 1.0 percent of the pore volume of an aqueous solution of the chelating or sequestering agent may be injected into the formation ahead of the active solution.

If desired, both ways of preventing precipitation may be combined. Thus, a slug of water may be injected into the injection well and passed into the formation, followed by a slug of aqueous solution containing the chelating agent, prior to the active solution. If the active solution is injected in a slug following the slug of water and the slug of chelating agent in solution, it will be passed through the formation by injecting thereafter a driving fluid such as water. In the event that subsequent slugs of active solutions are injected, it is unnecessary to inject the chelating agent or a separate slug of fresh water in advance of such slugs of active solution.

The invention provides a method of achieving more nearly uniform injection and flow profiles when flowing a liquid in a subterranean formation. The invention has been particularly described for use in secondary recovery of oil from subterranean formations. The invention serves to reduce interfacial tensions with most crude oils.

Thus, at the high injection velocities which occur in the vicinity of the injection well in secondary recovery operations, the in-situ crude oil is displaced from the interstices of the formation thereabout. This results in less liquid blocking of the formation adjacent the injection well.

While the invention has been described particularly in connection with the recovery of oil from a subterranean formation by displacement of the oil therein, it will be understood that the invention is also applicable to other operations carried out in a subterranean formation. For example, a subterranean formation may be treated by the injection, and flow, therein of a positive nonsimple liquid for fracturing of the formation. Further, a subterranean formation may be treated by the injection, and flow, therein of a positive nonsimple liquid in conjunction with a solvent whereby said solvent more uniformly dissolves solid matter and increases the permeability of the subterranean formation.

Having thus described our invention, it will be understood that such description has been given by way of illustration and example and not by way of limitation, reference for the latter purpose being had to the appended claims.

What is claimed is:

1. In a method of treating a subterranean formation, the step comprising passing into said formation water having incorporated a copper cetyl tolyl ether sulfonate in a quantity sufficient to provide a solution which is viscoelastic and is also a shear hardening, positive nonsimple liquid.

2. The method of claim 1 wherein said copper cetyl tolyl ether sulfonate is copper cetyl o-tolyl ether sulfonate.

3. The method of claim 1 wherein said copper cetyl tolyl ether sulfonate is copper cetyl p-tolyl ether sulfonate.

4. The method of claim 1 wherein said copper cetyl tolyl ether sulfonate is in a concentration of from 0.0002 to 5.0 percent by weight.

5. The method of claim 1 wherein said copper cetyl tolyl ether sulfonate is in a concentration of from 0.01 to 1.0 percent by weight.

6. In a method for the recovery of oil from a subterranean formation by injecting at least one fluid through an injection well and into said formation and producing oil from said formation through a production well, the improvement comprising passing into said formation water having incorporated a copper cetyl tolyl ether sulfonate in a quantity sufficient to provide a solution which is viscoelastic and is also a shear hardening, positive nonsimple liquid.

7. The method of claim 6 wherein said copper cetyl tolyl ether sulfonate is copper cetyl o-tolyl ether sulfonate.

8. The method of claim 6 wherein said copper cetyl tolyl ether sulfonate is copper cetyl p-tolyl ether sulfonate.

9. The method of claim 6 wherein said copper cetyl tolyl ether sulfonate is in a concentration of from 0.0002 to 5.0 percent by weight.

10. The method of claim 6 wherein said copper cetyl tolyl ether sulfonate is in a concentration of from 0.01 to 1.0 percent by weight.

11. A method of recovering oil from an oil-containing subterranean formation penetrated by at least one injection well and at least one production well which comprises the steps of:
(a) injecting from 0.01 to 0.1 pore volume of a viscoelastic, shear hardening, positive nonsimple liquid comprising an aqueous solution having a concentration of from 0.01 to 1.0 percent by weight of a copper cetyl tolyl ether sulfonate therein into said injection well and displacing oil within said formation,
(b) thereafter injecting a driving fluid and displacing said positive nonsimple liquid within said formation toward said production well, and
(c) producing oil from said production well.

12. The method of claim 11 wherein said positive nonsimple liquid is injected alternately with said driving fluid, said driving fluid being injected in volume at least as great as said positive nonsimple liquid.

13. The method of claim 11 wherein said driving fluid is water.

14. The method of claim 11 wherein said driving fluid is natural gas.

15. A method of recovering oil from an oil-containing subterranean formation having completed therein an injection means comprising at least one injection well and a production means comprising at least one production well, comprising the steps of:
(a) injecting through said injection means a slug of from 0.01 to 10.0 percent pore volume of water,
(b) injecting through said injection means a slug of from 0.01 to 1.0 percent pore volume of an aqueous solution containing from 0.1 to 1.7 percent by weight of a chelating agent selected from the class consisting of tetrasodium ethylenediaminetetraacetic acid, sodium phosphate glass, and sodium pyrophosphate,
(c) injecting through said injection means a slug of from 1 to 10 percent pore volume of active solution comprising water having incorporated therein a copper cetyl tolyl ether sulfonate in a quantity sufficient to create a viscoelastic, shear hardening, positive nonsimple liquid,
(d) injecting through said injection means water to drive the foregoing liquids toward said production means, and
(e) producing the oil displaced from within said formation through said production means.

References Cited by the Examiner

UNITED STATES PATENTS

| | | | |
|---|---|---|---|
| 2,356,205 | 8/1944 | Blair et al. | 252—8.55 |
| 2,670,048 | 2/1954 | Menaul | 166—42 X |
| 3,126,952 | 3/1964 | Jones | 166—9 |
| 3,198,252 | 8/1965 | Walker et al. | 166—32 |
| 3,279,537 | 10/1966 | Kirk et al. | 166—9 |

References Cited by the Applicant

UNITED STATES PATENTS

| | | |
|---|---|---|
| 2,792,894 | 5/1957 | Graham et al. |
| 2,800,962 | 7/1957 | Garst. |
| 2,802,531 | 8/1957 | Cardwell et al. |
| 2,808,109 | 10/1957 | Kirk. |
| 2,811,207 | 10/1957 | Clark. |
| 2,839,466 | 6/1958 | Schock et al. |
| 2,852,077 | 9/1958 | Cocks. |
| 3,070,162 | 12/1962 | Barnard. |

OTHER REFERENCES

G. S. Hartley, "Sulfonates of Higher Alkyl Phenolic Ethers," Journal of Chemical Society, 1939, pp. 1828–34.

H. N. Dunning and R. T. Johansen, "Laboratory Evaluation of Water Additives for Petroleum Displacement," Report of Investigations 5352, U.S. Department of the Interior, Bureau of Mines, July 1957.

CHARLES E. O'CONNELL, *Primary Examiner.*

S. J. NOVOSAD, *Assistant Examiner.*